(12) United States Patent
Wakatsuki (10) Patent No.: US 8,475,684 B2
(45) Date of Patent: *Jul. 2, 2013

(54) COMPOSITE OXIDE FOR HYDROCARBON REFORMING CATALYST, PROCESS FOR PRODUCING THE SAME, AND PROCESS FOR PRODUCING SYNGAS USING THE SAME

(75) Inventor: Toshiya Wakatsuki, Funabashi (JP)

(73) Assignee: Japan Petroleum Exploration Co., Ltd., Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 12/737,511

(22) PCT Filed: Jul. 17, 2009

(86) PCT No.: PCT/JP2009/063004
§ 371 (c)(1),
(2), (4) Date: Jan. 19, 2011

(87) PCT Pub. No.: WO2010/010857
PCT Pub. Date: Jan. 28, 2010

(65) Prior Publication Data
US 2011/0121238 A1 May 26, 2011

(30) Foreign Application Priority Data
Jul. 23, 2008 (JP) .................... 2008-190062

(51) Int. Cl.
*C01B 3/38* (2006.01)
*C07C 11/02* (2006.01)
*B01J 23/00* (2006.01)
*B01J 21/00* (2006.01)
*B01J 20/00* (2006.01)

(52) U.S. Cl.
USPC ........... 252/373; 502/306; 502/314; 502/315; 502/319; 502/326; 502/327; 502/328; 502/335; 502/337; 502/341; 502/355

(58) Field of Classification Search
USPC ............... 502/306, 314, 315, 319, 326, 327, 502/328, 335, 337, 341, 355; 252/373
See application file for complete search history.

(56) References Cited

U.S. PATENT DOCUMENTS

| 3,256,207 | A | * | 6/1966 | Arnold ........................... 502/63 |
| 3,421,871 | A | | 1/1969 | Davies |

(Continued)

FOREIGN PATENT DOCUMENTS

| JP | S42-7252 | 3/1967 |
| JP | 58-049602 | 3/1983 |

(Continued)

OTHER PUBLICATIONS

Yusaki Hashimoto et al., "GTL Process no Tameno Koatsu Methan Kaishitsu Hannoyo MgO Tanji Hikinzoku Shokubai no Kaihatsu (3)", Dai 101 Kai Shokubai Toronkai Torokai A. Yokoshu, Mar. 28, 2008, p. 93.

(Continued)

Primary Examiner — Cam N. Nguyen
(74) Attorney, Agent, or Firm — Kenyon & Kenyon LLP (57) ABSTRACT

A composite oxide for a hydrocarbon reforming catalyst which maintains the catalytic activity at a high level over a long period of time, a process for producing the catalyst, and a process for producing syngas using the catalyst, are provided. The composite oxide for a hydrocarbon reforming catalyst is obtained by a process including preparing a mixed solution for impregnation which contains catalytic active components of Co, or Co and Ni, one or more oxidation resistance enhancing components selected from the elements of Group 3B and the elements of Group 6A of the Periodic Table, and one or more additive metal components selected from Ca and Mg; impregnating a carrier formed from a porous molded body selected from magnesia and a composite of magnesia and calcia, with the mixed solution for impregnation; drying the impregnated carrier; and calcining the dried carrier in an oxidizing atmosphere.

7 Claims, 1 Drawing Sheet

U.S. PATENT DOCUMENTS

| | | | | |
|---|---|---|---|---|
| 3,650,713 | A * | 3/1972 | Chinchen et al. | 48/198.7 |
| 3,951,861 | A * | 4/1976 | Shiraishi et al. | 502/178 |
| 4,149,996 | A * | 4/1979 | Manning | 502/306 |
| 4,212,766 | A * | 7/1980 | Brazdil et al. | 502/205 |
| 4,336,409 | A * | 6/1982 | Yamamoto et al. | 585/622 |
| 4,438,217 | A * | 3/1984 | Takata et al. | 502/205 |
| 4,732,884 | A * | 3/1988 | Sarumaru et al. | 502/205 |
| 5,393,722 | A * | 2/1995 | Holmgren | 502/327 |
| 5,470,815 | A * | 11/1995 | Kim et al. | 502/304 |
| 5,565,400 | A * | 10/1996 | Holmgren | 502/328 |
| 5,744,419 | A * | 4/1998 | Choudhary et al. | 502/326 |
| 5,756,421 | A * | 5/1998 | Choudhary et al. | 502/328 |
| 5,980,840 | A * | 11/1999 | Kleefisch et al. | 422/211 |
| 6,117,813 | A * | 9/2000 | McCauley et al. | 502/303 |
| 6,423,665 | B1 | 7/2002 | Okado et al. | |
| 6,436,871 | B1 * | 8/2002 | Liu | 502/335 |
| 6,479,691 | B1 * | 11/2002 | Sasaki et al. | 558/321 |
| 6,777,371 | B2 * | 8/2004 | Liu | 502/337 |
| 6,924,387 | B1 * | 8/2005 | Chang et al. | 558/323 |
| 7,157,401 | B2 * | 1/2007 | Purta et al. | 502/180 |
| 7,229,945 | B2 * | 6/2007 | Kauffman | 502/311 |
| 7,232,788 | B2 * | 6/2007 | Liang et al. | 502/311 |
| 7,365,041 | B2 * | 4/2008 | Miyaki et al. | 502/311 |
| 7,432,222 | B2 * | 10/2008 | Choudhary et al. | 502/304 |
| 7,501,377 | B2 * | 3/2009 | Liang et al. | 502/311 |
| 7,524,792 | B2 * | 4/2009 | Dieterle et al. | 502/311 |
| 7,632,777 | B2 * | 12/2009 | Teshigahara et al. | 502/311 |
| 7,985,710 | B2 * | 7/2011 | Wang et al. | 502/328 |
| 2002/0052289 | A1 * | 5/2002 | Manzer et al. | 502/66 |
| 2003/0165424 | A1 * | 9/2003 | Ramani et al. | 423/651 |
| 2004/0106817 | A1 * | 6/2004 | Paparizos et al. | 558/321 |
| 2004/0116284 | A1 * | 6/2004 | Stevenson et al. | 502/311 |
| 2007/0275849 | A1 * | 11/2007 | Shin et al. | 502/151 |

FOREIGN PATENT DOCUMENTS

| | | |
|---|---|---|
| JP | 2000-000469 | 1/2000 |
| JP | 2000-288394 | 10/2000 |
| JP | 2002-509483 | 3/2002 |
| JP | 2002-126528 | 5/2002 |
| JP | 2002-126529 | 5/2002 |
| JP | 2002-126530 | 5/2002 |
| JP | 2002-173303 | 6/2002 |
| JP | 2004-000900 | 1/2004 |
| JP | 2004-089812 | 3/2004 |
| JP | 2004-141860 | 5/2004 |
| JP | 2005-103468 | 4/2005 |
| JP | 2005-529744 | 10/2005 |
| JP | 2008-190062 | 11/2010 |
| RU | 94021643 | 4/1996 |
| RU | 94034103 | 7/1996 |
| RU | 2 132 299 | 6/1999 |
| RU | 2 301 772 | 6/2007 |
| WO | WO 92/11199 | 7/1992 |
| WO | 2004/000456 | 12/2003 |

OTHER PUBLICATIONS

Nagaoka Katsutoshi et al., Addition of $Al_2O_3$ or $Cr_2O_3$ Promotes Metal Reduction in a CoO—NiO—MgO Solid Solution Catalyst for $CH_4$/$H_2O$ Reforming, Chem Lett, Aug. 23, 2008, pp. 982, 983.

International Search Report, European International Application No. EP 09 80 0371, dated Nov. 15, 2011.

International Search Report, European International Application No. EP 09 80 0371, dated Nov. 29, 2011.

Office Action issued for Iraqi Patent Application No. 253/2008 on Jun. 27, 2012 with English translation thereof (7 sheets).

Office Action for U.S. Appl. No. 12/734,053 issued on Mar. 22, 2011 (cover page only).

Apr. 19, 2012 Office Action issued on related Russian Patent Application No. 2010113913-04(019591) with English translation thereof.

Office Action issued on related Japanese Patent Application No. 2009-537015 with English translation thereof.

Edited by Catalysis Society of Japan, Catalyst Lectures vol. 5 (Engineering edition 4), catalyst design, Kodansha Ltd., Dec. 10, 1985, pp. 100-101, with partial English translation thereof.

Edited by the Chemical Society of Japan, Experimental Chemistry Lectures 17 Organic Compound Inventions I (second part), Maruzen Co., Ltd., 1963, Second Edition, p. 260, with partial English translation thereof.

Edited by Chemical Dictionary Editorial Committee, Chemical Dictionary 4, Kyoritsu Shuppan Co., Ltd., Oct. 15, 1963, Pocket Edition, p. 777, with partial English translation thereof.

Japanese Patent Office, International Search Report, Dec. 22, 2008, from International Patent Application No. PCT/JP2008/068310, filed on Oct. 8, 2008.

Yusaku Hashimoto et al., "GTL Process no Tameno Koatsu Methane Kaishitsu Hannoyo MgO Tanji Hikinzoku Shokubai no Kaishitsu", The Japan Petroleum Institute Nenkai Shuki Taikai Koen Yoshishu, Dai 36 Kai Sekiyu/Sekiyu Kagaku Toronkai, Dec. 1, 2006, p. 190.

Yusaku Hashimoto et al., "GTL Process no Tameno Koatsu Methane Kaishitsu Hannoyo MgO Tanji Hikinzoku Shokubai no Kaishitsu (2)", Dai 99 Kai Shokubai Toronkai Toronkai A Yokosbu, Mar. 28, 2007, p. 12.

Osamu Yamazaki et al, Reduction of Carbon Dioxide by Methane with Ni—on—MgO—CaO Containing Catalysts, Chemistry Letters, 1992, pp. 1953-1954.

Decision of Grant issued for Russian Patent Application No. 2011105653 on Sep. 20, 2012 with English translation thereof.

Decision of Grant issued for Russian Patent Application No. 2010113913 on Sep. 26, 2012 with English translation thereof.

\* cited by examiner

COMPOSITE OXIDE FOR HYDROCARBON REFORMING CATALYST, PROCESS FOR PRODUCING THE SAME, AND PROCESS FOR PRODUCING SYNGAS USING THE SAME

BACKGROUND OF THE INVENTION

1. Field of the Invention

The present invention relates to a composite oxide for a hydrocarbon reforming catalyst for obtaining syngas, which is a gas mixture of carbon monoxide (CO) and hydrogen ($H_2$), from hydrocarbons such as methane, and reforming agents such as water and carbon dioxide, a process for producing the catalyst, and a process for producing syngas using the composite oxide.

This application claims priority on Japanese Patent Application No. 2008-190062 filed on 23 Jul. 2008, the disclosure of which is incorporated by reference herein.

2. Description of the Related Art

When a hydrocarbon such as methane, natural gas, petroleum gas, naphtha, heavy oil or crude oil, is reacted with a reforming agent such as water, air or carbon dioxide, in a high temperature region in the presence of a catalyst, the hydrocarbon is reformed to a gas mixture containing highly reactive carbon monoxide and hydrogen. The synthesized gas mixture of carbon monoxide and hydrogen is used as a raw material for methanol, liquid fuel oil, and the like. Recently, research and development is being conducted to extract hydrogen gas for fuel cells from the gas mixture. In the synthetic reaction of the gas mixture of carbon monoxide and hydrogen, a composite oxide for a hydrocarbon reforming catalyst (hereinafter, may be simply be referred to as reforming catalyst), such as nickel/alumina and nickel/magnesia/alumina, has been used.

In the reaction system of hydrocarbon/steam using a reforming catalyst, carbonaceous particles, a reaction by-product, are likely to be deposited on the catalyst surface. The deposited carbonaceous particles cover the active sites on the catalyst surface, and lower the catalytic activity. Massive deposition of carbonaceous particles causes clogging and damaging the catalyst, and also causes the gas drifting apart from the reaction zone, and as a result, the effective proportion of the catalyst contributing to the reforming reaction decreases. Deposition of the carbonaceous particles on the catalyst surface can be prevented by introducing an excess amount of steam, but an increase in energy costs, an enlargement of facilities, and the like are unavoidable.

In order to suppress deposition of carbonaceous particles without the need to supply an excess amount of steam, reforming catalysts in which the catalytic active components are highly dispersed have been proposed (Patent Documents 1 and 2). In the descriptions in the Patent Document 1, the following method is described as a method for obtaining a reforming catalyst in which the catalytic active components are highly dispersed. A method of adding a co-precipitator to an aqueous solution of the water-soluble salts of the respective constituent elements of the catalyst particles, to thus allow hydroxides to precipitate, and carrying out primary calcination in a temperature range of 673 K to 873 K, and secondary calcination in a temperature range of 1223 K to 1573 K, is employed. In regard to the reforming catalyst described in the Patent Document 2, a porous molded body (catalyst carrier) is immersed in an aqueous solution containing catalytic active components such as Ni and Co, and additive metal components such as Mg, Al, Zr, Ti and Ca, so that the catalytic active components and the carrier constituent components are allowed to penetrate into the porous molded body. Subsequently, the porous molded body is dried, and then subjected to calcination at a high temperature of 700° C. or higher, and an activation treatment at 500° C. or higher. Then, ultramicroparticulate catalyst particles are highly dispersed in the surface layer of the porous molded body. It is described that deposition of carbonaceous particles on the catalyst surface is suppressed by the high dispersion of catalyst particles, and that an excellent catalytically active operation is maintained over a long period of time.

Patent Document 3 also describes that if use is made of a metal particle-supporting composite oxide in which metal particles as a catalyst are uniformly deposited on the surface of a composite oxide as a substrate at a high density (number of catalyst particles per unit area), a small-sized, compact reformer having high activity is obtained.

[Patent Document 1] JP-A No. 2002-126528
[Patent Document 2] JP-A No. 2004-141860
[Patent Document 3] JP-A No. 2005-103468

SUMMARY OF THE INVENTION

However, although the reforming catalysts introduced by the Patent Documents 1 and 2 can suppress the adverse effects of the deposition of carbonaceous particles by means of high dispersion of catalytic active components, during long-term use, excess steam, carbon dioxide or the like may cause oxidation of catalytic active components, and thus result in a decrease in performance such as catalytic activity.

As a method for preventing lowering of the performance due to oxidation of the active components, it may be conceivable to cope with the problem by increasing the amount of active components supported. However, if a large amount of active components are present on the catalyst surface, the dispersibility of the active components cannot be maintained, and consequently, massive deposition of carbonaceous particles cannot be avoided. Furthermore, the reforming catalyst described in the Patent Document 3 supports a large amount of active components, and thus deposition of carbonaceous particles cannot be avoided when the reaction pressure is elevated.

The present invention has been designed to solve such problems, and it is an object of the invention to provide a composite oxide for a hydrocarbon reforming catalyst which maintains the catalytic activity at a high level for a long period of time, a process for producing the catalyst, and a process for producing a syngas using the catalyst.

The gas mixture of carbon monoxide and hydrogen is synthesized from hydrocarbon raw materials according to the reactions of the following reaction schemes (1) to (4). Meanwhile, the reactions by which carbonaceous particles are deposited on the catalyst surface are represented by the following reaction schemes (5) to (8). The carbonaceous particles deposited by the reactions of the following reaction schemes (5) to (8) accumulate between the catalytic active components and the catalyst carrier, thus decreasing the degree of activity and finally destroying the catalyst. Even if there is no decrease in the degree of activity, the accumulated carbonaceous particles cause the gas drifting apart from the reactor, and the proportion of the catalyst not contributing to the reforming reaction is likely to increase.

$$CH_4 + CO_2 \Leftrightarrow 2CO + 2H_2 \quad (1)$$

$$CH_4 + H_2O \Leftrightarrow CO + 3H_2 \quad (2)$$

$$C_nH_m + nH_2O \Leftrightarrow nCO + (n+m/2)H_2 \quad (3)$$

$$CO_2 + H_2 \Leftrightarrow CO + H_2O \quad (4)$$

$$2CO \Leftrightarrow C + CO_2 \quad (5)$$

$$CH_4 \Leftrightarrow C + 2H_2 \quad (6)$$

$$CO + H_2 \Leftrightarrow C + H_2O \quad (7)$$

$$C_nH_m \Rightarrow nC + m/2 H_2 \quad (8)$$

When the catalytic active components supported on a carrier are formed into very fine particles, deposition of carbonaceous particles disappears. The influence exerted by the particle size of the catalytic active components on the resolution of the accumulation of carbonaceous particles is conceived to be attributable to the fact that when compared with the reactions for generation and precipitation of the carbonaceous particles (5) to (8), the rates of the reverse reactions are relatively faster. As the particle size of the catalytic active components becomes finer, that is, as the catalytic active components are more highly dispersed, it has a tendency that the accumulation of carbonaceous particles becomes smaller. It was also found that an oxidation resistance enhancing component, such as gallium, chromium or tungsten, supported on the carrier surface, can suppress the oxidation of the catalytic active components due to steam, carbon dioxide or the like, or can enhance the oxidation resistance of the active components themselves. It was also found that the dispersion of the catalytic active components can be enhanced by simultaneously supporting catalytic active components, oxidation resistance enhancing components and additive metal components on a carrier. Thus, the invention was achieved based on these findings.

The process for producing a composite oxide for a hydrocarbon reforming catalyst of the invention is a process for producing a composite oxide having the composition represented by the following formula (I), and is characterized by including a preparation process for preparing a mixed solution for impregnation, which contain Co element, or Co and Ni elements, one or more oxidation resistance enhancing components selected from the group consisting of the elements of Group 3B and the elements of Group 6A of the Periodic Table, and one or more additive metal components selected from the group consisting of Ca and Mg; an impregnation process for impregnating a carrier which is formed from a porous molded body selected from magnesia or a composite of magnesia and calcia, with the mixed solution for impregnation; a drying process for drying the carrier impregnated with the mixed solution for impregnation; and a calcination process for calcining the carrier dried in the drying process in an oxidizing atmosphere, $$aM.bCo.cNi.dMg.eCa.fO \quad (I)$$

wherein a, b, c, d, e and f are molar fractions, a+b+c+d+e=1, 0.0001<a≦0.20, 0<b≦0.20, 0≦c≦0.20, 0.001<(b+c)≦0.20, 0.60≦(d+e)≦0.9989, 0<d<0.9989, 0<e<0.9989, and f=the number necessary for elements to maintain charge balance with oxygen; and M (hereinafter, may also be referred to as an oxidation resistance enhancing component) is at least one element among the elements of Group 3B and the elements of Group 6A of the Periodic Table.

The mixed solution for impregnation is preferably such that the ratio between the additive metal components and the catalytic active components (additive metal components/catalytic active components (molar ratio)) is from 0.5 to 5, and the oxidation resistance enhancing component represented by M is preferably at least one selected from the group consisting of Ga, Cr and W.

The composite oxide for a hydrocarbon reforming catalyst of the invention is characterized in that the composite is obtained by the process for producing a composite oxide for a hydrocarbon reforming catalyst.

The process for producing a syngas of the invention is characterized in that the syngas is obtained from a hydrocarbon and a reforming agent, using the composite oxide for a hydrocarbon reforming catalyst. The process for producing a syngas of the invention is preferably carried out such that the supply ratio between the reforming agent and the hydrocarbon, which is set to a ratio of reforming agent moles to carbon moles of the hydrocarbon, is from 0.3 to 100.

With the composite oxide for a hydrocarbon reforming catalyst of the invention, the catalytic activity of the hydrocarbon reforming catalyst formed from the composite oxide by activation treatment can be maintained at a high level for a long time period.

BRIEF DESCRIPTION OF THE DRAWINGS

In the FIGURE, reference number 1 denotes a catalyst, and reference number 2 denotes microparticles.

DETAILED DESCRIPTION OF THE INVENTION (Composite Oxide for Reforming Catalyst)

The composite oxide for a reforming catalyst of the invention is a composite oxide for a hydrocarbon reforming catalyst having a composition represented by the following formula (I), and has Co, Ni and M dispersed in the composite oxide. This composite oxide is obtainable by impregnating a carrier formed from a porous molded body, with a mixed solution for impregnation containing catalytic active components, oxidation resistance enhancing components and additive metal components, drying the carrier impregnated with the mixed solution for impregnation, and then calcining the carrier.

According to the invention, the composition represented by the following formula (I) is shown on the basis of anhydrides after calcination.

$$aM.bCo.cNi.dMg.eCa.fO \quad (I)$$

wherein a, b, c, d, e and f are molar fractions; a+b+c+d+e=1; 0.0001<a≦0.20, 0<b≦0.20, 0≦c≦0.20, 0.001<(b+c)≦0.20, 0.60≦(d+e)≦0.9989, 0<d<0.9989, 0<e<0.9989, f=the number necessary for elements to maintain charge balance with oxygen; and M is at least one element among the elements of Group 3B and the elements of Group 6A of the Periodic Table.

Here, the Periodic Table referred herein is the IUPAC standard periodic table.

<Oxidation Resistance Enhancing Component>

M in the formula (I), which is the oxidation resistance enhancing component, is at least one element among the elements of Group 3B and the elements of Group 6A of the Periodic Table. Among them, gallium is preferred as for the element of Group 3B, while chromium or tungsten is preferred as for the element of Group 6A. When at least one selected from gallium, chromium and tungsten is used as the oxidation resistance enhancing component, the oxidation resistance ability of the reforming catalyst formed from the composite oxide can be further enhanced.

In regard to this composition, if the content of M (a) is 0.0001 or less, the oxidation suppressive effect is not apparent, and if the content is greater than 0.20, the activity of the reforming reaction is lowered, and thus it is improper. Therefore, the content of M (a) is $0.0001<a\leqq0.20$, preferably $0.0001<a\leqq0.15$, and more preferably $0.0001<a\leqq0.10$.

<Catalytic Active Component>

The catalytic active component is Co, or Co and Ni. The cobalt content (b) is $0<b\leqq0.20$, and the nickel content (c) is $0\leqq c\leqq0.20$. If the total of the cobalt content (b) and the nickel content (c) (b+c) is 0.001 or less, the content of cobalt and/or nickel is too small, and the reaction activity is low. If the total amount is greater than 0.20, high dispersedness, which will be described later, is inhibited, and the carbonaceous deposition preventive effect cannot be sufficiently obtained. Therefore, the total of the cobalt content (b) and the nickel content (c) (b+c) is $0.001<(b+c)\leqq0.20$, preferably $0.001<(b+c)\leqq0.15$, and more preferably $0.001<(b+c)\leqq0.10$.

<Additive Metal Component>

The additive metal component is one or more selected from the group consisting of Mg and Ca. Here, the magnesium content (d) and the calcium content (e) in the formula (I) are the respective total amount of magnesium and total amount of calcium supplied from the additive metal component and the carrier.

The total of the magnesium content (d) and the calcium content (e) (d+e) in the composite oxide for a reforming catalyst is $0.60\leqq(d+e)\leqq0.9989$, preferably $0.70\leqq(d+e)\leqq0.9989$, and more preferably $0.80\leqq(d+e)\leqq0.9989$. Among these, the magnesium content (d) is $0<d<0.9989$, preferably $0.20\leqq d<0.9989$, and more preferably $0.50\leqq d<0.9989$.

The calcium content (e) is $0<e<0.9989$, preferably $0<e\leqq0.5$, and more preferably $0<e\leqq0.3$.

The total of the magnesium content (d) and the calcium content (e) (d+e) is determined by the balance with the content of M (a), the cobalt content (b) and the nickel content (c). If the value of (d+e) is within the above-described range, an effect of having an excellent reforming reaction at any proportions will be exhibited. However, if the calcium content (e) is high, even though there are effects on the suppression of carbonaceous deposition, the catalytic activity is lower than when compared to the case where the content of magnesium (d) is larger. Accordingly, in the case where activity is regarded as important, if the calcium content (e) is greater than 0.5, the activity is lowered, which is not preferable.

The composite oxide according to the invention is a type of solid solution in which magnesia (MgO) or calcia (CaO) adopts a rock salt type crystal structure, and a portion of the magnesium or calcium atoms located in the lattice are substituted with cobalt, nickel and M. The composite oxide does not imply a mixture of oxides of the respective single elements. According to the invention, cobalt, nickel and M are in the state of being highly dispersed within this composite oxide.

The dispersion according to the invention is as generally defined in the field of catalysis, and as disclosed in, for example, "Lectures on Catalysts, Vol. 5, Catalyst Design," page 141 (edited by Catalysis Society of Japan, published by Kodansha, Ltd.) and the like, the dispersion is determined by the ratio of the number of atoms exposed at the metal surface to the total atom number of the supported metal.

To explain this specifically by referring to the schematic diagram of FIG. 1 according to the invention, after the activation (reduction) treatment that will be described later, there exist numerous microparticles 2, which are hemispherically shaped or the like, and which serve as the active centers, at the surface of a catalyst 1 formed from a composite oxide, and each of these microparticles 2 is composed of metal elementals of cobalt, nickel and M, or compounds thereof. When the number of atoms of the metal elemental of cobalt, nickel and M as well as compounds thereof contained in this microparticle 2 is designated as A, and the number of the atoms exposed at the surface of the microparticle 2 among the aforementioned atoms is designated as B, the ratio B/A is taken as the dispersion ratio.

If it is considered that those involved in the catalytic reaction are the atoms exposed at the surface of the microparticle 2, it may be conceived that a dispersion ratio close to 1 implies that many atoms are distributed over the surface, and the active centers increase in number, thus resulting in high activity. Also, if the particle size of the microparticle 2 becomes indefinitely smaller, most of the atoms constituting the microparticle 2 are exposed at the surface of the microparticle 2, and the dispersion ratio is approximately 1. Therefore, the particle size of the microparticle 2 may be used as an index representing the dispersion ratio.

The diameter of the microparticle 2, on the treated composite oxide of the invention after the activation (reduction) treatment, is less than 3.5 nm, which is the limit of measurement by various measurement methods such as, for example, X-ray diffraction method. From this, it can be said that the dispersion ratio is high, and the catalyst formed from the composite oxide is in a highly dispersed state. For this reason, the number of atoms of cobalt, nickel and M involved in the reaction increases, the catalyst becomes highly active, and the reaction progresses stoichiometrically, thus preventing deposition of carbonaceous matter (carbon).

(Process for Producing Composite Oxide for Reforming Catalyst)

The process for producing a composite oxide for a reforming catalyst of the invention will be described. The process for producing a composite oxide for a reforming catalyst of the invention includes a preparation process for preparing a mixed solution for impregnation, which contains a catalytic active component, an additive metal component and an oxidation resistance enhancing component (hereinafter, may be collectively referred to as components for impregnation); an impregnation process for impregnating a carrier formed from a porous molded body with the mixed solution for impregnation; a drying process for drying the carrier impregnated with the mixed solution for impregnation; and a calcination process for calcining the carrier dried in the drying process in an oxidizing atmosphere.

<Preparation Process>

The preparation process is a process for preparing a mixed solution for impregnation by dissolving catalytic active components of Co, or Co and Ni; one or more oxidation resistance enhancing components selected from the group consisting of the elements of Group 3B and the elements of Group 6A from the Periodic Table; and one or more additive metal components selected from the group consisting of Ca and Mg, in a solvent.

In regard to the solvent for the mixed solution for impregnation, a solvent which is capable of dissolving the catalytic active component, the oxidation resistance enhancing component and the additive metal component to arbitrary concentrations, can be appropriately selected, and for example, pure water or the like may be mentioned.

The form of the catalytic active component upon addition to the solvent may be any form in which the catalytic active component dissolves to an arbitrary concentration, and there may be mentioned an organic acid salt such as acetate or formate, or an inorganic salt such as nitrate or chloride, of Co or Ni.

The concentration of the catalytic active component in the mixed solution for impregnation can be determined by taking into consideration the molar fractions of a to e in the formula (I) for a desired composite oxide for a reforming catalyst, and the amount of impregnation into the carrier. 0.1 to 5 moles/L is preferable.

The form of the oxidation resistance enhancing component upon addition to the solvent may be any form in which the oxidation resistance enhancing component dissolves to an arbitrary concentration, and there may be mentioned an organic acid salt such as acetate or formate, or an inorganic salt such as nitrate or chloride, of an element of Group 3B or an element of Group 6A of the Periodic Table.

The concentration of the oxidation resistance enhancing component in the mixed solution for impregnation can be determined by taking the molar fractions of a to e in the formula (I) for a desired composite oxide for a reforming catalyst, and the amount of impregnation into the carrier into consideration. 0.1 to 5 moles/L is preferable.

The proportions of addition of the catalytic active component and the oxidation resistance enhancing component in the mixed solution for impregnation can be determined by taking the ability required from the composite oxide for a reforming catalyst into consideration. The ratio of the oxidation resistance enhancing component to the catalytic active component (molar ratio) is preferably from 0.001 to 0.5, and more preferably 0.01 to 0.5. If the ratio of the oxidation resistance enhancing component to the catalytic active component (molar ratio) is less than 0.001, there is a concern that the suppression of oxidation of the catalytic active component may be achieved insufficiently. If the ratio of the oxidation resistance enhancing component to the catalytic active component (molar ratio) exceeds 0.5, there is a concern that the proportion of the oxidation resistance enhancing component in the composite oxide for a reforming catalyst may become too high, and a desired activity may not be obtained.

The form of the additive metal component upon addition to the solvent may be any form in which the additive metal component dissolves to an arbitrary concentration, for example, an organic acid salt such as acetate or formate, or an inorganic salt such as nitrate or chloride, of Mg or Ca may be used.

The concentration of the additive metal component in the mixed solution for impregnation can be determined by taking it into consideration that the molar fractions a to e in the formula (I) of composite oxide for a reforming catalyst, the amount of impregnation into the carrier, the degree of dispersion of the catalytic active component, and the oxidation resistance enhancing component in the composite oxide for a reforming catalyst. 0.1 to 5 moles/L is preferable. The ratio of addition of the additive metal component and the catalytic active component in the solution for impregnation are such that the ratio of the additive metal component to the catalytic active component (molar ratio) is preferably from 0.5 to 5, and more preferably 0.5 to 3. If the ratio of the additive metal component to the catalytic active component (molar ratio) is less than 0.5, there is a concern that the dispersion of the catalytic active component may become insufficient, and a desired catalytic activity may not be obtained. If the ratio of the additive metal component to the catalytic active component (molar ratio) exceeds 5, there is a concern that the proportion of the additive metal component may become too high, and the proportions of the catalytic active component which is adjacent to the oxidation resistance enhancing component may be decreased, so that the oxidation resistance effect of the reforming catalyst formed from the resulting composite oxide may become insufficient.

<Impregnation Process>

The impregnation process is a process in which a carrier formed from a porous molded body made of a material selected from magnesia, a composite of magnesia, and calcia is obtained (carrier molding treatment), and the carrier is impregnated with the mixed solution for impregnation (impregnation treatment).

[Carrier Molding Treatment]

In the carrier molding treatment, at least one material selected from magnesia, a composite of magnesia, and calcia is molded and calcined, and thereby a carrier formed from a porous molded body (hereinafter, may be simply referred to as carrier) can be obtained. The carrier can support relative large amounts of the catalytic active component and the oxidation resistance enhancing component, because of the structure in which pores are open to the surface. The supported amount of the catalytic active component increases with the pore volume (porosity) of the carrier, and an increase in the porosity means a decrease in the strength of the carrier. For that reason, the porosity of the carrier can be appropriately set while taking the supported amount required for the catalytic active component and the carrier strength into consideration, and for example, it is preferable to set the porosity in the range of 10 to 50% by volume.

The carrier can be incorporated with, for example, a lubricant such as graphite, cement or a binder effective for an enhancement of the strength of the molded body, and the like, as necessary, and can be adjusted to have a required porosity by addition of an expanding agent or the like.

In regard to the method of molding the carrier, a method capable of molding to a desired shape can be appropriately selected, and for example, there may be mentioned a method of molding the powder of magnesia or of a composite of magnesia and calcia by compression molding, extrusion molding or the like. The pressure conditions for molding can be determined while taking the porosity required from the carrier into consideration. The porosity can be lowered by increasing the pressure at the time of molding, and increasing the compact density of the carrier powder. Also, the porosity can be enhanced by decreasing the pressure at the time of molding, and decreasing the compact density of the carrier powder.

The shape of the carrier can be determined in accordance with the use of the reforming catalyst, and for example, a cylindrical shape, a ring shape, a honeycomb shape, and the like may be used.

The conditions for calcination of the carrier can be appropriately determined in accordance with the shape of the carrier or with the desired porosity.

When the calcination temperature is lowered, the porosity can be increased, and when the calcination temperature is elevated, the porosity can be decreased. The calcination temperature for the carrier is preferably in the range of, for example, 500 to 1400° C., and is more preferably in the range of 700 to 1200° C.

[Impregnation Treatment]

The impregnation treatment involves impregnating the carrier obtained by the carrier molding treatment, with the mixed solution for impregnation obtained in the preparation process.

For the impregnation treatment, a method in which the components in the mixed solution for impregnation can be impregnated to desired amounts of carrier, can be selected, and for example, methods such as immersion, spraying, coating and the like can be used. It is preferable to use a method of immersing the carrier in the mixed solution for impregnation, from the viewpoint of uniformly impregnating the carrier with the components for impregnation.

It is preferable that the temperature of the mixed solution for impregnation is in the range of 0 to 80° C.

In the impregnation treatment, it is preferable that the amount of the catalytic active component supported on the carrier be 0.1 to 20% by mole. This is because there is a concern that if the amount is less than 0.1% by mole, the amount of the catalytic active component supported is too small and the reaction activity is low, and if the amount exceeds 20% by mole, the high dispersion of the catalytic active component is inhibited, and thus the effect of preventing the deposition of carbonaceous matter cannot be sufficiently obtained. The amount of the catalytic active component supported on the carrier can be controlled by appropriately setting the conditions for impregnation treatment, such as the concentration of the catalytic active component in the mixed solution for impregnation, the temperature of the mixed solution for impregnation, and the time required for the impregnation treatment, in accordance with the absorptivity of the carrier. It is preferable that the impregnation time is from 10 to 60 mins. Here, the amount of the catalytic active component supported can be measured by fluorescence X-ray analysis or atomic absorption analysis.

The temperature of the mixed solution for impregnation in the impregnation treatment is preferably 0 to 80° C. If the temperature is lower than 0° C., there is a concern that the impregnation of the carrier with the components for impregnation may be insufficient. If the temperature exceeds 80° C., there is a concern that a situation may occur in which a portion of the carrier is turned into hydroxides, the catalyst strength is decreased, or the like.

In the case of performing the impregnation treatment by immersing the carrier in a mixed solution for impregnation, the immersion time is preferably 10 to 60 minutes. If the immersion time is less than 10 minutes, there is a concern that the impregnation of the components for impregnation into the elemental substance may be insufficient. If the immersion time is longer than 60 minutes, there is a concern that a large amount of the oxides constituting the carrier may turn into hydroxides.

<Drying Process>

The drying process is a process for drying by removing the solvent of the mixed solution for impregnation from the carrier which has been impregnated with the mixed solution for impregnation (hereinafter, may also be referred to as composite oxide precursor).

As the method of drying the composite oxide precursor, for example, heating and drying may be mentioned. The heating temperature during the process of heating and drying can be determined in accordance with the solvent of the mixed solution for impregnation, and as the heating temperature is elevated, evaporation of the solvent is accelerated, and the drying time is shortened. However, if the heating temperature is too high, there is a concern that explosive boiling occurs so that the amount of the components for impregnation supported may become non-uniform, or the composite oxide precursor may conspicuously undergo shrinkage and be finally destroyed. Therefore, for example, if the solvent is water, it is preferable for the temperature to be 100° C. or above, and more preferably to be in the range of 100 to 180° C.

The time for heating and drying can be determined in accordance with the solvent of the mixed solution for impregnation. For example, if the solvent is water, it is preferable for the time period to be 0.5 to 100 hours, and more preferably to be 1 to 50 hours. It is because, within the aforementioned range, moisture can be sufficiently removed, and destruction of the composite oxide precursor due to overheating can be prevented.

The extent of residual solvent in the composite oxide precursor after drying is preferably reduced as far as possible, but the extent can be determined while taking the time that can be consumed in the drying process into consideration. By sufficiently drying the composite oxide precursor, a part of the water of crystallization is removed, and the volume change of the composite oxide precursor in the subsequent calcination process can be reduced. This is because there is a concern that if the composite oxide precursor is insufficiently dried, explosive boiling of the residual solvent or shrinkage of the composite oxide precursor is likely to occur in the calcination process, and that this may lead to destruction of the composite oxide precursor.

Here, the amount of the solvent residue can be determined by the decrease in the mass of the composite oxide precursor before and after the drying process.

<Calcination Process>

The calcination process is a process for calcining the composite oxide precursor which has been dried in the drying process, or a composite oxide precursor which has been provisionally calcined in the provisional calcination process that will be described later, in an oxidizing atmosphere to form a composite oxide.

The oxidizing atmosphere is an atmosphere containing oxygen in an excess amount compared to the amount of oxygen required for the catalytic active component, the oxidation resistance enhancing component and the additive metal component to be oxidized to form composite oxides and to be supported on the carrier. Atmospheric air or the like may be mentioned as an example.

The calcination temperature is a temperature at which the components for impregnation are turned into composite oxides, and it is preferable to carry out calcination at 700 to 1300° C., and more preferably at 900 to 1300° C. If the temperature is lower than 700° C., there is a concern that the oxidation of the catalytic active component, the oxidation resistance enhancing component, and the additive metal component may be insufficient. If the temperature is higher than 1300° C., there is a concern that the surface area of the catalyst is reduced, and the catalytic activity may be decreased.

It is also preferable to carry out the calcination for 1 to 20 hours. If the calcination time is less than one hour, there is a concern that the oxidation of the catalytic active component, the oxidation resistance enhancing component, and the additive metal component may be insufficient. If the calcination time is longer than 20 hours, there is a possibility that the catalytic activity may be decreased.

In the case where the procedure from the preparation process to the calcination process is taken as one cycle, if the amount of the catalytic active component supported on the carrier does not reach the desired supported amount in one cycle, the supported amount can be adjusted to the desired supported amount by repeating the impregnation treatment of the impregnation process and the drying process. Furthermore, the supported amount can be adjusted to be the desired supported amount, by also providing a provisional calcination process between the drying process and the calcination process, and repeating the impregnation treatment of the impregnation process, the drying process and the provisional calcination process.

<Provisional Calcination Process>

The provisional calcination process is a process between the drying process and the calcination process, for calcining the composite oxide precursor which has been dried in the drying process in an oxidizing atmosphere. When such a composite oxide precursor which has been provisionally calcined in a provisional calcination process is calcined in the calcination process, a composite oxide for a reforming catalyst can be obtained.

The oxidizing atmosphere is an atmosphere containing oxygen in an excess amount compared to the amount of oxygen required for the catalytic active component, the oxidation resistance enhancing component and the additive metal component to be oxidized to form composite oxides and to be supported on the carrier. Atmospheric air or the like may be mentioned as an example.

The provisional calcination temperature is not particularly limited as long as it is a temperature capable of oxidizing the components for impregnation, and it is preferable to perform the calcination at 450 to 1000° C., and more preferably at 450 to 900° C. If the temperature is lower than 450° C., there is a concern that the oxidation of the catalytic active component, the oxidation resistance enhancing component and the additive metal component may be insufficient. If the temperature is higher than 1000° C., there is a concern that the porosity of the carrier may be reduced.

Furthermore, it is preferable to carry out provisional calcination for 1 to 20 hours. If the calcination time is less than one hour, there is a concern that the oxidation of the catalytic active component, the oxidation resistance enhancing component and the additive metal component may be insufficient. If the calcination time is longer than 20 hours, there is a possibility that the porosity of the carrier may be decreased.

(Process for Producing Syngas)

The process for producing syngas of the invention will be described. The process for producing syngas of the invention involves obtaining syngas from a hydrocarbon and a reforming agent, by using the above-described composite oxide for a reforming catalyst of the present invention.

First, an activation treatment is performed on the composite oxide for a reforming catalyst. This activation treatment is performed by heating the composite oxide for a reforming catalyst in the presence of a reducing gas such as hydrogen gas, in a temperature range of 500 to 1000° C., preferably 600 to 1000° C., and more preferably 650 to 1000° C., for approximately 0.5 to 50 hours. The reducing gas may be diluted with an inert gas such as nitrogen gas. This activation treatment can also be performed in a reactor for performing the reforming reaction.

Figure 1:
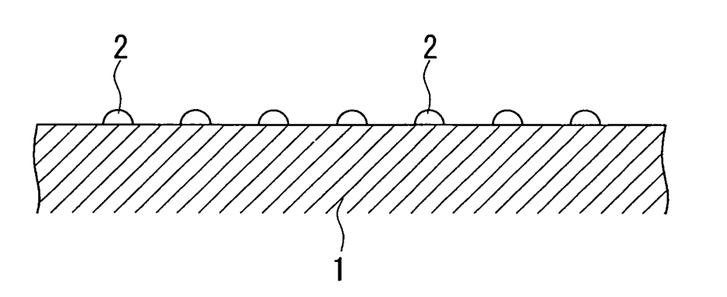
FIG. 1 is an explanatory diagram schematically showing the state of the surface of the catalyst formed from the composite oxide of the invention by activation treatment.

Through this activation treatment, the microparticles 2, containing a metal element of Co, Ni, M, or a compound thereof, is observed on the surface of the catalyst 1 in FIG. 1, and the catalytic activity is manifested. The activation treatment according to the invention is performed at a higher temperature than the temperature for the conventional activation of Co or Ni oxide-based catalysts. Since the activation treatment for the conventional Co or Ni oxide-based catalysts is usually performed at a temperature below 500° C., there is a possibility that the activation treatment at high temperature according to the invention may contribute to the above-mentioned high level of dispersion.

Subsequently, a raw material gas formed from a hydrocarbon and a reforming agent is supplied to a reaction tube packed with the treated composite oxide (that is the reforming catalyst formed from the composite oxide by the activation treatment) which has been subjected to the aforementioned activation treatment, and the reaction occurs under arbitrary reaction conditions. Specifically, the temperature is 500 to 1000° C., preferably 600 to 1000° C., and more preferably 650 to 1000° C. If the temperature is lower than 500° C., the conversion rate for the hydrocarbon is low and impractical, and under the conditions exceeding 1000° C., a reaction tube resistant to high temperature is additionally required, and there is a problem in terms of economic efficiency. In regard to the pressure conditions (gauge pressure; hereinafter, the same), the reaction is performed in a pressure in a range of 0.1 to 10 MPa, preferably in a range of 0.1 to 5 MPa, and more preferably in a range of 0.1 to 3 MPa. This is because, if the pressure is less than 0.1 MPa, the reaction tube must be enlarged, and thus the capital investment needed or the like is increased, and if the pressure exceeds 10 MPa, a reaction tube resistant to high pressure is required.

It is desirable for the space velocity of the raw material gas (GHSV: the value obtained by dividing the rate of supply of the raw material gas by the amount of catalyst in terms of volume), to be in a range of 500 to 200,0001 $h^{-1}$, preferably in a range of 1,000 to 100,000 $h^{-1}$, and more preferably in a range of 1,000 to 75,000 $h^{-1}$. Furthermore, the shape of the catalyst bed can be arbitrarily selected from well known shapes thereof, such as a fixed bed shape, a moving bed shape, or a fluidized bed shape.

As for the hydrocarbon which serves as the raw material for syngas, natural gas, petroleum gas, naphtha, heavy oil, crude oil or the like; or hydrocarbons obtained from coal, coal sand or the like, are used, and these raw materials are not particularly limited as long as they partially contain hydrocarbons such as methane. These may also be used in a mixture of two or more species.

As for the reforming agent, water (steam), carbon dioxide and the like are used, and two or more species may also be used as mixtures. A preferred reforming agent is water, carbon dioxide, or a mixture of water and carbon dioxide.

During the reaction, the supply ratio of the reforming agent and the hydrocarbon (reforming agent moles/carbon moles of the hydrocarbon) is from 0.3 to 100, preferably from 0.3 to 10, and more preferably from 0.5 to 3, as expressed in the molar ratio based on the number of carbon atoms in the hydrocarbon. If the ratio of reforming agent moles to carbon moles of the hydrocarbon is less than 0.3, the deposition of carbonaceous matter becomes vigorous, and if the ratio is greater than 100, the reaction tube must be enlarged, and therefore, the capital investment needed or the like is increased.

The mixed gas of the hydrocarbon and the reforming agent may include an inert gas such as nitrogen co-present as a diluent.

According to the invention, since the catalytic active component, the oxidation resistance enhancing component and the additive metal component are dissolved in a solvent to prepare a mixed solution for impregnation, and the components for impregnation are simultaneously transferred to the carrier from the mixed solution for impregnation, the components for impregnation can be uniformly distributed in the surface layer of the carrier. Furthermore, when the carrier is impregnated with magnesium or calcium as the additive metal component, apart from the magnesium or calcium contained in the carrier, the catalytic active component and the oxidation resistance enhancing component can be uniformly dispersed in the surface layer of the carrier. As a result of this, suppression of the oxidation of the catalytic active component, or enhancement of the oxidation resistance of the catalytic active component itself can definitely be promoted, and the proportion of the catalytic active component contributing to the catalytic reaction of the reforming catalyst is significantly increased. Consequently, the amount of catalyst consumption can be reduced.

According to the present invention, high activity is obtained by using the reforming catalyst formed from the composite oxide of the invention, in which CoO, NiO or MOx is converted into a composite oxide with MgO or MgO/CaO, and cobalt, nickel and M are dispersed therein. Also, even if a hydrocarbon such as methane and a reforming agent such as steam are allowed to react in the same stoichiometric amounts or in amounts approximate thereto, the deposition of carbonaceous matter (carbon) is suppressed, and syngas can be produced efficiently. For this reason, an excessive amount of a reforming agent such as steam does not need to be supplied, the reforming agent is not wasted, and syngas can be produced at a low cost. Also, since the catalyst is not contaminated with carbonaceous matter, a decrease in the catalytic activity over time is suppressed, and the lifetime of the catalyst is extended. The decrease in the catalyst performance due to oxidation is also suppressed, and it becomes possible to maintain the catalytic activity at a high level over a long period of time.

EXAMPLES

Hereinafter, the present invention will be described specifically by way of Examples, but the invention is not intended to be limited thereto.

Example 1

A magnesia powder containing 0.1% by mass of calcium was molded into a cylindrical shape having an external diameter of 3 mm and a height of 3 mm, and was calcined at 1100° C. to obtain a carrier (carrier molding treatment). For the aqueous solution for impregnation, 238.39 g of $Co(NO_3)_2$.$6H_2O$ as a catalytic active component, 36.91 g of $Cr(NO_3)_2$.$9H_2O$ as an oxidation resistance enhancing component, and 420.06 g of $Mg(NO_3)_2$.$6H_2O$ as a dispersion enhancing component were dissolved in water, to prepare one liter of a mixed solution (preparation process). The carrier was immersed for 30 minutes in the mixed solution for impregnation which had been maintained at ambient temperature (impregnation treatment), and the composite oxide precursor pulled up from the aqueous solution was dried in atmospheric air at 120° C. for 12 hours (drying process), and then calcined in atmospheric air at 500° C. for 3 hours (provisional calcination process). The impregnation treatment, the drying process and the provisional calcination process were repeated four times, and then a fifth impregnation treatment and a drying process were carried out. Thereafter, the composite oxide precursor was calcined in atmospheric air at 1250° C. for 5 hours (calcination process), to adjust the supported amount of Co (catalytic active component) to 5% by mole. Thereby, a composite oxide A was obtained.

A composite oxide having a catalytic active component, an oxidation resistance enhancing component and an additive metal component, which are simultaneously supported on a carrier by using a mixture solution containing a catalytic active component, an oxidation resistance enhancing component and an additive metal component, will be indicated in Table 1 with "simultaneous method" for the process for production (the same for Examples 2 to 6).

The resulting composite oxide A was subjected to the Reaction Examples 1 to 3 that will be described later. The results of the Reaction Examples 1 to 3 are presented in Table 1.

Example 2

A composite oxide B was obtained in the same manner as in Example 1, except that the amount of $Co(NO_3)_2$.$6H_2O$ in Example 1 was changed to 238.03 g, 36.91 g of $Cr(NO_3)_2$.$9H_2O$ was changed to 27.54 g of $Ga(NO_3)_2$.$nH_2O$, and the amount of $Mg(NO_3)_2$.$6H_2O$ was changed to 419.43 g. The resulting composite oxide B was subjected to Reaction Examples 1 to 3 that will be described later. The results of the Reaction Examples 1 to 3 are presented in Table 1.

Example 3

A composite oxide C was obtained in the same manner as in Example 1, except that the amount of $Co(NO_3)_2$.$6H_2O$ in Example 1 was changed to 237.38 g, 36.91 g of $Cr(NO_3)_2$.$9H_2O$ was changed to 6.83 g of $(NH_4)_{10}W_{12}O_{41}5H_2O$, and the amount of $Mg(NO_3)_2$.$6H_2O$ was changed to 418.28 g. The resulting composite oxide C was subjected to Reaction Examples 1 to 3 that will be described later. The results of the Reaction Examples 1 to 3 are presented in Table 1.

Example 4

A composite oxide D was obtained in the same manner as in Example 1, except that 238.39 g of $Co(NO_3)_2$.$6H_2O$ in Example 1 was changed to 178.79 g of $Co(NO_3)_2$.$6H_2O$ and 59.55 g of $Ni(NO_3)_2$.$6H_2O$. The resulting composite oxide D was subjected to Reaction Examples 1 to 3 that will be described later. The results of the Reaction Examples 1 to 3 are presented in Table 1.

Example 5

A composite oxide E was obtained in the same manner as in Example 2, except that 238.03 g of $Co(NO_3)_2$.$6H_2O$ in Example 2 was changed to 178.52 g of $Co(NO_3)_2$.$6H_2O$ and 59.46 g of $Ni(NO_3)_2$.$6H_2O$. The resulting composite oxide E was subjected to Reaction Examples 1 to 3 that will be described later. The results of the Reaction Examples 1 to 3 are presented in Table 1.

Example 6

A composite oxide F was obtained in the same manner as in Example 3, except that 237.38 g of $Co(NO_3)_2$.$6H_2O$ in Example 3 was changed to 178.03 g of $Co(NO_3)_2$.$6H_2O$ and 59.30 g of $Ni(NO_3)_2$.$6H_2O$. The resulting composite oxide F was subjected to Reaction Examples 1 to 3 that will be described later. The results of the Reaction Examples 1 to 3 are presented in Table 1.

Comparative Example 1

A magnesia powder containing 0.1% by mass of calcium was molded into a cylindrical shape having an external diameter of 3 mm and a height of 3 mm, and was calcined at 1100° C. to obtain a carrier. For the aqueous solution for impregnation, 397.32 g of $Co(NO_3)_2$.$6H_2O$ as a catalytic active component was dissolved in water to prepare one liter of an aqueous solution of catalytic active component. Also, 184.54 g of $Cr(NO_3)_2$.$9H_2O$ as an oxidation resistance enhancing component was dissolved in water to prepare one liter of an aqueous solution of oxidation resistance enhancing component. The carrier was immersed for 30 minutes in the aqueous solution of catalytic active component which had been maintained at ambient temperature, and then the composite oxide precursor pulled up from the aqueous solution was dried in atmospheric air at 120° C. for 12 hours. Immersion and drying were repeated three times until the supported amount of Co (catalytic active component) reached 5% by mole. After drying, the composite oxide precursor was immersed for 30 minutes in the aqueous solution of oxidation resistance enhancing component which had been maintained at ambient temperature, and was dried at 120° C. for 12 hours. After drying, the composite oxide precursor to which nitrates of Co and Cr had penetrated, was heated and calcined in atmospheric air at 1250° C. for 5 hours, to obtain a composite oxide G.

A composite oxide having a catalytic active component and an oxidation resistance enhancing component, which are individually supported on a carrier by using a solution containing the catalytic active component or a solution containing the oxidation resistance one by one, will be indicated in Table 1 with "division method" for the process for production (the same for Comparative Examples 2 to 6).

The resulting composite oxide G was subjected to Reaction Examples 1 to 3 that will be described later. The results of the Reaction Examples 1 to 3 are presented in Table 1.

Comparative Example 2

A composite oxide H was obtained in the same manner as in Comparative Example 1, except that the amount of $Co(NO_3)_2.6H_2O$ in Comparative Example 1 was changed to 396.72 g, and 184.54 g of $Cr(NO_3)_2.9H_2O$ was changed to 137.69 g of $Ga(NO_3)_2.nH_2O$. The resulting composite oxide H was subjected to Reaction Examples 1 to 3 that will be described later. The results of the Reaction Examples 1 to 3 are presented in Table 1.

Comparative Example 3

A composite oxide I was obtained in the same manner as in Comparative Example 1, except that the amount of $Co(NO_3)_2.6H_2O$ in Comparative Example 1 was changed to 395.63 g, and 184.54 g of $Cr(NO_3)_2.9H_2O$ was changed to 34.13 g of $(NH_4)_{10}W_{12}O_{41}.5H_2O$. The resulting composite oxide I was subjected to Reaction Examples 1 to 3 that will be described later. The results of the Reaction Examples 1 to 3 are presented in Table 1.

Comparative Example 4

A composite oxide J was obtained in the same manner as in Comparative Example 1, except that 397.32 g of $Co(NO_3)_2.6H_2O$ in Comparative Example 1 was changed to 297.99 g of $Co(NO_3)_2.6H_2O$ and 99.25 g of $Ni(NO_3)_2.6H_2O$. The resulting composite oxide J was subjected to Reaction Examples 1 to 3 that will be described later. The results of the Reaction Examples 1 to 3 are presented in Table 1.

Comparative Example 5

A composite oxide K was obtained in the same manner as in Comparative Example 2, except that 397.32 g of $Co(NO_3)_2.6H_2O$ in Comparative Example 2 was changed to 297.54 g of $Co(NO_3)_2.6H_2O$ and 99.10 g of $Ni(NO_3)_2.6H_2O$. The resulting composite oxide K was subjected to Reaction Examples 1 to 3 that will be described later. The results of the Reaction Examples 1 to 3 are presented in Table 1.

Comparative Example 6

A composite oxide L was obtained in the same manner as in Comparative Example 3, except that 395.63 g of $Co(NO_3)_2.6H_2O$ in Comparative Example 3 was changed to 296.72 g of $Co(NO_3)_2.6H_2O$ and 98.83 g of $Ni(NO_3)_2.6H_2O$. The resulting composite oxide L was subjected to Reaction Examples 1 to 3 that will be described later. The results of the Reaction Examples 1 to 3 are presented in Table 1.

Comparative Example 7

A composite oxide M was obtained in the same manner as in Example 1, except that $Co(NO_3)_2.6H_2O$ in Example 1 was changed to 236.98 g, 36.91 g of $Cr(NO_3)_2.9H_2O$ was not added, and $Mg(NO_3)_2.6H_2O$ in Example was changed to 417.58 g. The resulting composite oxide M was subjected to Reaction Examples 1 to 3 that will be described later. The results of the Reaction Examples 1 to 3 are presented in Table 1.

Comparative Example 8

A composite oxide N was obtained in the same manner as in Comparative Example 7, except that 236.98 g of $Co(NO_3)_2.6H_2O$ in Comparative Example 7 was changed to 177.73 g of $Co(NO_3)_2.6H_2O$ and 56.20 g of $Ni(NO_3)_2.6H_2O$. The resulting composite oxide N was subjected to Reaction Examples 1 to 3 that will be described later. The results of the Reaction Examples 1 to 3 are presented in Table 1.

Comparative Example 9

A composite oxide O was obtained in the same manner as in Comparative Example 1, except that $Co(NO_3)_2.6H_2O$ in Comparative Example 1 was changed to 394.96 g of $Co(NO_3)_2.6H_2O$ and 184.54 g of $Cr(NO_3)_2.9H_2O$ was not added. The resulting composite oxide O was subjected to Reaction Examples 1 to 3 that will be described later. The results of the Reaction Examples 1 to 3 are presented in Table 1.

Comparative Example 10

A composite oxide P was obtained in the same manner as in Comparative Example 9, except that 394.96 g of $Co(NO_3)_2.6H_2O$ in Comparative Example 9 was changed to 296.22 g of $Co(NO_3)_2.6H_2O$ and 98.66 g of $Ni(NO_3)_2.6H_2O$. The resulting composite oxide P was subjected to Reaction Examples 1 to 3 that will be described later. The results of the Reaction Examples 1 to 3 are presented in Table 1.

The compositions a to e are calculated by using the supported amount of Co (as a catalytic active component) of 5% by mole. The results are presented in Table 2.

Reaction Example 1

The composite oxides A to L were subjected to an activation treatment in which 20 mL of each of the composite oxides was packed in a flow-through type reaction tube having an inner diameter of 16 mm, and the catalyst bed was heated to and maintained at 850° C. or above while hydrogen gas was supplied thereto.

Subsequently, while the outlet temperature of the catalyst bed was maintained at 850° C., and the atmospheric pressure was maintained at 2.0 MPa, a reactant gas of methane, carbon dioxide, and steam at a ratio of 2/1/2 was sent into the flow-through type reaction tube under the conditions of a gas hourly space velocity (GHSV) of 3000 $h^{-1}$. The methane conversion rate and the amount of carbon deposited on the catalyst at 20 hours after the reaction time are presented in Table 1.

Reaction Example 2

Carbon dioxide was omitted from the reactant gas of Reaction Example 1, and methane and steam at a ratio of 2/3 was sent into the flow-through type reaction tube under the conditions of a GHSV of 3000 h$^{-1}$. The methane conversion rate at 20 hours after the reaction time is presented in Table 1.

Reaction Example 3

Carbon dioxide was omitted from the reactant gas of Reaction Example 1, and methane and steam at a ratio of 2/3 was sent into the flow-through type reaction tube under the conditions of a catalyst bed outlet temperature of 580° C. and a GHSV of 72,000 h$^{-1}$. The methane conversion rate 5 hours after the reaction time is presented in Table 1.

(Methane Conversion Rate)

The methane concentration in the reactant gas (methane concentration in raw material gas), and the methane concentration at the catalyst bed outlet (post-reaction methane concentration) were measured by gas chromatography, and the methane conversion rate was determined by the following formula (II).

$$\text{Methane conversion rate (\%)} = \frac{\left(\begin{array}{c}\text{Methane concentration in raw material gas} \times \\ \text{Raw material gas flow rate at catalyst bed inlet}\end{array}\right) - \left(\begin{array}{c}\text{Post-reaction methane concentration} \times \\ \text{Gas flow rate at catalyst bed outlet}\end{array}\right)}{\left(\begin{array}{c}\text{Methane concentration in raw material gas} \times \\ \text{Raw material gas flow rate at catalyst bed inlet}\end{array}\right)} \times 100 \quad \text{(II)}$$

(Amount of Carbon Deposition)

After completing the reaction of Reaction Example 1, the catalyst was removed from the reaction tube, and the amount of carbon deposited on the catalyst surface was measured by a thermogravimetric analysis method and a temperature programmed oxidation method.

TABLE 1

| | | | | | Reaction Example 1 | | Reaction Example 2 | Reaction Example 3 |
|---|---|---|---|---|---|---|---|---|
| | | | | | Reactant gas | | | |
| | | | | | Methane/carbon dioxide/steam = 2/1/2 | | Methane/steam = 2/3 | Methane/steam = 2/3 |
| | | | | | GHSV (h$^{-1}$) | | | |
| | | | | | 3000 | | 3000 | 72000 |
| | Catalytic active component | | Oxidation resistance enhancing | | Methane conversion | Amount of carbon deposition | Methane conversion | Methane conversion |
| No. | Co | Ni | component | Production process | rate (%) | (mass %) | rate (%) | rate (%) |
| Example 1 | ○ | X | Cr | Simultaneous method | 61 | 6 | 63 | 11 |
| Example 2 | ○ | X | Ga | Simultaneous method | 61 | 5 | 63 | 10 |
| Example 3 | ○ | X | W | Simultaneous method | 61 | 5 | 63 | 10 |
| Example 4 | ○ | ○ | Cr | Simultaneous method | 61 | 4 | 63 | 20 |
| Example 5 | ○ | ○ | Ga | Simultaneous method | 61 | 7 | 63 | 18 |
| Example 6 | ○ | ○ | W | Simultaneous method | 61 | 6 | 63 | 17 |
| Comparative Example 1 | ○ | X | Cr | Division method | 61 | 7 | 63 | 5 |
| Comparative Example 2 | ○ | X | Ga | Division method | 61 | 6 | 63 | 6 |
| Comparative Example 3 | ○ | X | W | Division method | 61 | 6 | 63 | 5 |
| Comparative Example 4 | ○ | ○ | Cr | Division method | 61 | 5 | 63 | 11 |
| Comparative Example 5 | ○ | ○ | Ga | Division method | 61 | 6 | 63 | 14 |
| Comparative Example 6 | ○ | ○ | W | Division method | 61 | 6 | 63 | 10 |
| Comparative Example 7 | ○ | X | X | Simultaneous method | 61 | 5 | 7 | 0** |
| Comparative Example 8 | ○ | ○ | X | Simultaneous method | 61 | 5 | 63 | 0* |
| Comparative Example 9 | ○ | X | X | Division method | 61 | 5 | 5 | 0** |
| Comparative Example 10 | ○ | ○ | X | Division method | 61 | 5 | 63 | 0* |

*Methane conversion rate after 5 hours;
**Deactivation of the catalyst was observed after 1 hour.

TABLE 2

| No. | Co | Ni | M | M a | Co b | Ni c | Mg d | Ca e | O f |
|---|---|---|---|---|---|---|---|---|---|
| Example 1 | ○ | x | Cr | 0.0056 | 0.0500 | — | 0.9383 | 0.0061 | 1.0028 |
| Example 2 | ○ | x | Ga | 0.0042 | 0.0500 | — | 0.9397 | 0.0061 | 1.0021 |
| Example 3 | ○ | x | W | 0.0016 | 0.0500 | — | 0.9423 | 0.0061 | 1.0008 |
| Example 4 | ○ | ○ | Cr | 0.0056 | 0.0375 | 0.0125 | 0.9383 | 0.0061 | 1.0028 |
| Example 5 | ○ | ○ | Ga | 0.0042 | 0.0375 | 0.0125 | 0.9397 | 0.0061 | 1.0021 |
| Example 6 | ○ | ○ | W | 0.0016 | 0.0375 | 0.0125 | 0.9423 | 0.0061 | 1.0008 |
| Comparative Example 1 | ○ | x | Cr | 0.0056 | 0.0500 | — | 0.9376 | 0.0068 | 1.0028 |
| Comparative Example 2 | ○ | x | Ga | 0.0042 | 0.0500 | — | 0.9390 | 0.0068 | 1.0021 |
| Comparative Example 3 | ○ | x | W | 0.0016 | 0.0500 | — | 0.9416 | 0.0068 | 1.0008 |
| Comparative Example 4 | ○ | ○ | Cr | 0.0056 | 0.0375 | 0.0125 | 0.9376 | 0.0068 | 1.0028 |
| Comparative Example 5 | ○ | ○ | Ga | 0.0042 | 0.0375 | 0.0125 | 0.9390 | 0.0068 | 1.0021 |
| Comparative Example 6 | ○ | ○ | W | 0.0016 | 0.0375 | 0.0125 | 0.9416 | 0.0068 | 1.0008 |
| Comparative Example 7 | ○ | x | x | — | 0.0500 | — | 0.9439 | 0.0061 | 1.0000 |
| Comparative Example 8 | ○ | ○ | x | — | 0.0375 | 0.0125 | 0.9439 | 0.0061 | 1.0000 |
| Comparative Example 9 | ○ | x | x | — | 0.0500 | — | 0.9432 | 0.0068 | 1.0000 |
| Comparative Example 10 | ○ | ○ | x | — | 0.0375 | 0.0125 | 0.9432 | 0.0068 | 1.0000 |

Table 1 shows the results of the Reaction Examples 1 to 3 for Examples 1 to 6 and Comparative Examples 1 to 10.

In Examples 1 to 6 and Comparative Examples 1 to 10, not only high methane conversion rates were maintained even after 20 hours in the Reaction Example 1, but also the amount of carbon deposition was suppressed.

In Examples 1 to 6 and Comparative Examples 1 to 6, 8 and 10, high methane conversion rates were maintained even after 20 hours in the Reaction Example 2. However, in Comparative Examples 7 to 9, the methane conversion rates decreased greatly in the Reaction Example 2.

From the results of the Reaction Example 3, it was seen that in Examples 1 to 6 and Comparative Examples 1 to 6, even though the space velocity of the raw material gas was markedly increased, deactivation or occlusion of the catalyst was not observed. However, in Comparative Examples 7 and 9, deactivation of the catalyst was observed after 1 hour, and in Comparative Examples 8 and 10, the methane conversion rates decreased greatly after 5 hours.

However, it was found in regard to the composite oxide for a reforming catalyst, having Co as the catalytic active component, that the Examples 1 to 3 in which a composite oxide for a reforming catalyst, produced by the simultaneous method is used, had higher methane conversion rates in the Reaction Example 3, when compared with the Comparative Examples 1 to 3 in which a composite oxide for a reforming catalyst, produced by the division method is used. It was also found, in regard to the composite oxide for a reforming catalyst, having Co and Ni as the catalytic active components, that the Examples 4 to 6 in which a composite oxide for a reforming catalyst, produced by the simultaneous method is used, had higher methane conversion rates in the Reaction Example 3, when compared with the Comparative Examples 4 to 6 in which a composite oxide for a reforming catalyst, produced by the division method is used.

From these results, it was speculated that the composite oxide for a reforming catalyst, produced by the simultaneous method has the catalytic active component highly dispersed, when compared with the composite oxide for a reforming catalyst, produced by the division method.

What is claimed is:

1. A composite oxide for a hydrocarbon reforming catalyst, having a composition represented by the following formula (I), $$aM.bCo.cNi.dMg.eCa.fO \quad (I)$$

wherein a, b, c, d, e and f are molar fractions, $a+b+c+d+e=1$, $0.0001 < a \leq 0.20$, $0 < b \leq 0.20$, $0 \leq c \leq 0.20$, $0.001 < (b+c) \leq 0.20$, $0.60 \leq (d+e) \leq 0.9989$, $0 < d < 0.9989$, $0 < e < 0.9989$, and f is the number necessary for elements to maintain charge balance with oxygen; and M is at least one element among the elements of Group 3B and the elements of Group 6A of the Periodic Table, the composite oxide is obtained by a process which comprises:

preparing a mixed solution for impregnation containing a catalytic active component of Co element, or Co and Ni elements, one or more oxidation resistance enhancing components selected from the group consisting of the elements of Group 3B and the elements of Group 6A of the Periodic Table, and one or more additive metal components selected from the group consisting of Ca and Mg;

impregnating a carrier formed from a porous molded body selected from magnesia or a composite of magnesia and calcia, with the mixed solution for impregnation;

drying the carrier impregnated with the mixed solution for impregnation; and calcining the dried carrier in an oxidizing atmosphere.

2. The composite oxide for a hydrocarbon reforming catalyst, according to claim 1, wherein the mixed solution for impregnation is such that the ratio of the additive metal component and the catalytic active component (additive metal component/catalytic active component (molar ratio)) is from 0.5 to 5.

3. The composite oxide for a hydrocarbon reforming catalyst, according to claim 1, wherein the oxidation resistance enhancing component represented by M is at least one selected from the group consisting of Ga, Cr and W.

4. The composite oxide for a hydrocarbon reforming catalyst, according to claim 2, wherein the oxidation resistance enhancing component represented by M is at least one selected from the group consisting of Ga, Cr and W.

5. A process for producing the composite oxide for a hydrocarbon reforming catalyst according to any one of claims 1 to 4, comprising:

preparing a mixed solution for impregnation containing a catalytic active component of Co element, or Co and Ni elements, one or more oxidation resistance enhancing components selected from the group consisting of the elements of Group 3B and the elements of Group 6A of the Periodic Table, and one or more additive metal components selected from the group consisting of Ca and Mg;

impregnating a carrier formed from a porous molded body selected from magnesia or a composite of magnesia and calcia, with the mixed solution for impregnation;

drying the carrier impregnated with the mixed solution for impregnation; and calcining the dried carrier in an oxidizing atmosphere.

6. A process for producing syngas, comprising performing an activation treatment on the composite oxide according to any one of the claims 1 to 4 in the presence of a reducing gas, and obtaining syngas from a hydrocarbon and a reforming agent by using the composite oxide for a hydrocarbon reforming catalyst.

7. The process for producing syngas according to claim 6, wherein the supply ratio of the reforming agent and the hydrocarbon, that is reforming agent moles/carbon moles of hydrocarbon, is from 0.3 to 100.

* * * * *